(12) United States Patent  
Joseph et al.

(10) Patent No.: US 9,160,822 B2  
(45) Date of Patent: Oct. 13, 2015

(54) CONNECTOR DEVICE

(71) Applicant: SANDISK TECHNOLOGIES INC., Plano, TX (US)

(72) Inventors: Amir Joseph, Kefar Sava (IL); Itzhak Pomerantz, Kefar Sava (IL); Yacov Duzly, Ra'Anana (IL)

(73) Assignee: SANDISK TECHNOLOGIES INC., Plano, TX (US)

( * ) Notice: Subject to any disclaimer, the term of this patent is extended or adjusted under 35 U.S.C. 154(b) by 0 days.

(21) Appl. No.: 13/789,033

(22) Filed: Mar. 7, 2013

(65) Prior Publication Data

US 2014/0256192 A1 Sep. 11, 2014

(51) Int. Cl.
*H04M 1/00* (2006.01)
*H01R 31/06* (2006.01)

(52) U.S. Cl.
CPC *H04M 1/00* (2013.01); *H01R 31/06* (2013.01)

(58) Field of Classification Search
CPC .......................... H01R 35/04; H01R 23/7073
USPC ............. 439/131, 660, 701, 43, 79, 171, 172, 439/518
See application file for complete search history.

(56) References Cited

U.S. PATENT DOCUMENTS

| | | | | |
|---|---|---|---|---|
| 4,950,178 | A * | 8/1990 | Harvey et al. | 439/507 |
| 6,843,684 | B2 * | 1/2005 | Milan | 439/606 |
| 7,001,192 | B1 | 2/2006 | Yeh | |
| 7,753,712 | B2 | 7/2010 | Miki | |
| 7,946,893 | B2 | 5/2011 | Chen et al. | |
| 8,156,349 | B2 * | 4/2012 | Nagamine | 713/300 |

OTHER PUBLICATIONS

Cables to Go 46084 Flex Adapter—USB, http://www.google.com/products/catalog?hl=en&tok=-gKYNy-PzNyDwYokdAN7sQ&pq=flexgeer+us&cp=13&gs_id=2t&xhr=t&q=usb+flex+connector&bav=on.2,or.r_gc.r_pw.r_cp.r_qt.,cf.osb&biw=1920&bih=947&um=1&ie=UTF-8&tbm=shop&cid=16136923346737794759&sa=X&ei=DIO-T8yxI4fctAbGt7j1DQ&sqi=2&ved=0CJ0BEPICMAU, printed Jun. 8, 2012, 2 pages.

Broida, Rick. "Hardware Tips: USB Flex Adapter, HDMI Monitors," PC World, http://www.pcworld.com/article/235069/hardware_tips_usb_flex_adapter_hdmi_monitors.html, Jul. 5, 2011, 5 pages.

Ideative FL001 FlexUSB Flexible USB Adapter, http://www.google.com/products/catalog?hl=en&tok=-gKYNy-PzNyDwYokdAN7sQ&pq=flexgeer+us&cp=13&gs_id=2t&xhr=t&q=usb+flex+connector&bav=on.2,or.r_gc.r_pw.r_cp.r_qf.,cf.osb&biw=1920&bih=947&um=1&ie=UTF-8&tbm=shop&cid=9608387493089874738&sa=X&ei=DIO-T8yxI4fctAbGt7j1DQ&sqi=2&ved=0CKABEPICMAY, printed Jun. 8, 2012, 2 pages.

(Continued)

*Primary Examiner* — Phuongchi T Nguyen
(74) *Attorney, Agent, or Firm* — Toler Law Group, PC (57) ABSTRACT

A device includes a first leg including a first connector. The first connector includes multiple electrical contacts. The device includes a second leg substantially parallel to the first leg and configured with a connector, a set of conductors, or both. The device includes a transverse portion connected to the first leg and to the second leg. Together, the transverse portion and the first and second legs form a substantially rigid or semi-rigid body. The transverse portion includes multiple conductors electrically coupling respective connectors on the first and second legs.

18 Claims, 10 Drawing Sheets

(56) References Cited

OTHER PUBLICATIONS

Provantage: RIM Blackberry USB Flex Adapter Mini to Micro M/F F/ Blackberry, http://www.provantage.com/rim/blackberry-asy-18686-003~7RIMO010.htm, printed Jun. 8, 2012, 2 pages.

Flexible USB 2.0 Angled Adapter Swivel Rotating Gender Changer, http://www.vpi.us/usb-gender-flex.html, printed Jun. 8, 2012, 2 pages.

* cited by examiner

CONNECTOR DEVICE

FIELD OF THE DISCLOSURE

The present disclosure is generally related to connection devices.

BACKGROUND

Mobile devices, such as tablet computers and mobile phones, conventionally include a connector to enable data transfer with an external device and/or power transfer. For example, Universal Serial Bus (USB) connectors are commonly used to enable charging of a mobile device and to enable data transfer to and from a memory internal to the mobile device. As an example, a mobile phone may include a micro-USB socket embedded within a top edge of the mobile phone to enable a micro-USB plug to be inserted downward into the socket, with a cord protruding upward from the plug.

Operators of vehicles such as automobiles often use a cradle to hold a mobile phone to enable hands-free use of the mobile phone while operating the vehicle. However, using a conventional micro-USB plug to charge a mobile phone having a top-mounted socket may cause the upwardly-protruding cord to at least partially obscure a field of view of the operator. In addition, for in-vehicle charging, the cord typically terminates with a cigarette lighter-type adaptor that is inserted into a power socket (e.g. a cigarette lighter socket) that is positioned lower than the cradle. To illustrate, the cradle may be positioned at a car dashboard near the steering wheel and the power socket may be positioned at a center console of the car. As a result, the upwardly-projecting cable from the micro-USB plug at the top of the mobile phone may bend 180 degrees to extend downward to the power socket, producing mechanical stress (e.g. torque) on both the micro-USB plug and the micro-USB socket in the mobile phone.

SUMMARY

A connector device having two legs connected via a traverse portion routes electrical signals received from a cable attached to one of the legs to a connector attached to the other leg. The cable and the connector are oriented in a same direction so that when the connector is attached to a mating connector at a top edge of an electronic device (e.g. a mobile phone), the cable can extend downward along a back surface of the other device without requiring a 180 degree bend of the cable. The connector device may contact a surface of the electronic device to transfer forces received from the cable to the body of the electronic device. Transferring forces to the body of the electronic device reduces stress applied to the connector and to the mating connector in the electronic device. In some implementations, the cable may be integrated with the connector device, while in other implementations the cable may be connected via a second connector embedded in the second leg of the connector device.

DETAILED DESCRIPTION

Referring to FIGS. 1-4 a system is illustrated in multiple views. System 102, system 104, and system 106 include a connector device 110 and a user device 120. For example, the user device 120 may be an electronic device such as a mobile phone.

Figure 1:
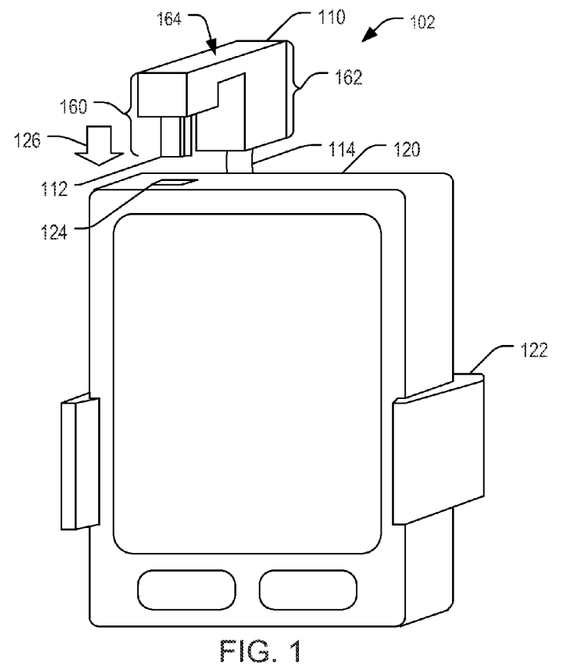
FIG. 1 is a diagram illustrating a first view of a system including a first embodiment of a connector device.

The connector device 110 in FIG. 1 includes a first leg 160, a second leg 162, and a transverse member 164. Together, the transverse member 164 with first and second legs 160, 162 form a connector body capable of withstanding and reducing the stress formed by the aforementioned forces. To this end, the connector body or at least part thereof are substantially rigid or semi-rigid to avoid undue stress from twisting bending or other forces. In some embodiments, however, the semi-rigidity, or even flexibility of a part, allows physical accommodation for various thickness dimensions of a user device 120. The first leg 160 includes a connector 112, illustrated as a plug. The connector 112 may be a communication bus connector. For example, the connector 112 may be a universal serial bus (USB)-type connector, such as a USB-type plug. The connector 112 is configured to be inserted into a mating connector 124, such as a socket, of the user device 120.

The second leg 162 of the connector device 110 is substantially parallel to the first leg 160 and includes a cable 114 extending from a bottom portion of the second leg 162. For example, as illustrated in a first view 102, the device 110 is oriented in an upside down "U" configuration, with the two legs 160, 162 of the "U" pointing downward and the transverse member 164 in a substantially horizontal orientation. The connector 112 extends downward from the first leg 160 and the cable 114 extends downward from the second leg 162. The user device 120 may be configured to be held in a vertical configuration, such as shown in the first view 102. For example, the user device 120 may be used by an operator of a motor vehicle and may be held upright attached to a windshield or a dashboard of the motor vehicle via a holder or cradle 122.

Figure 2:
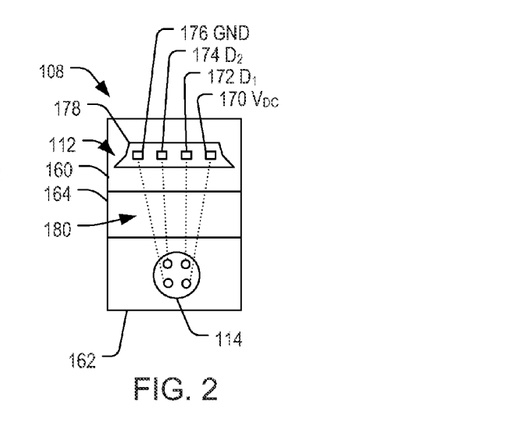
FIG. 2 is a diagram illustrating a second view of a system including a first embodiment of a connector device.
Figure 3:
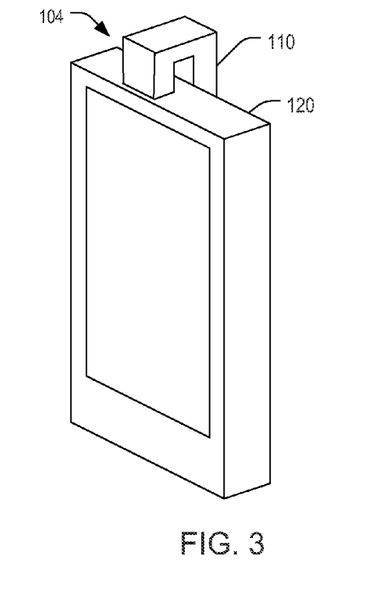
FIG. 3 is a diagram illustrating a third view of a system including a first embodiment of a connector device.

The connector device 110 may be attached to the user device 120 by insertion of the connector 112 into the mating connector 124, illustrated as a socket embedded in a top surface of the user device 120. The connector 112 may be inserted into the mating connector 124 in a direction indicated by an arrow 126 in the first view 102. A second view 104 illustrates the connector device 110 connected to the user device 120 in a front perspective view showing a front surface of the user device 120. A third view 106 illustrates the user device 120 attached to the connector device 110 in a back perspective view.

Figure 4:
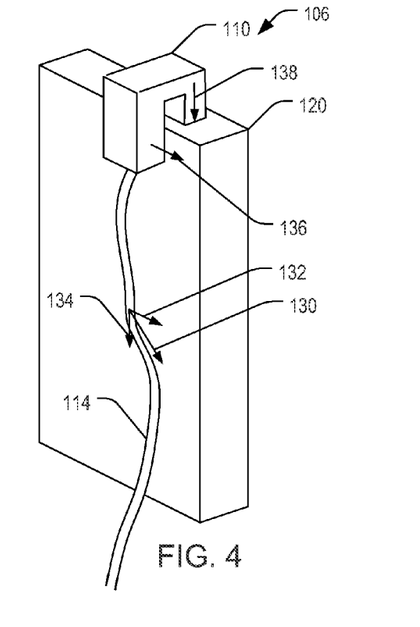
FIG. 4 is a diagram illustrating a fourth view of a system including a first embodiment of a connector device.

A fourth view 108 illustrates the connector device 110 as seen from the user device 120 in the first view 102. The connector 112 is illustrated as including multiple electrical contacts including a direct-current (DC) supply contact 170 to provide a supply voltage ($V_{DC}$), a ground contact 176 to provide an electrical ground (GND), and two electrical signal contacts $D_1$ 172 and $D_2$ 174. The connector 112 may also include a metallic shield 178.

The transverse portion 164 includes multiple conductors 180 illustrated as dotted lines to indicate that the multiple conductors 180 are internal to the transverse portion 164. The multiple conductors 180 (e.g., wires) include a first conductor coupled to the DC supply contact 170, a second conductor coupled to the ground contact 176, and two conductors coupled to the signal contacts 172 and 174 to route respective electrical signals via the second leg 162 to the connector 112. The second leg 162 is configured with a set of conductors (e.g., multiple conductive lines) that are electrically coupled to the multiple conductors 180 and are shown in a cross-section of the cable 114.

In some implementations the electrical signal contacts 172, 174 may carry a differential signal (e.g., corresponding to a single data path), while in other implementations the electrical signal contacts 172, 174 may each carry a distinct data signal (e.g., corresponding to two data paths). Although two electrical signal contacts 172, 174 are illustrated, in other implementations more than two electrical signal contacts may be included in the connector 112. Further, in other implementations, the connector 112 may include additional contacts such as to carry a clock signal, a host/slave indicator, one or more other electrical signals and/or DC voltages, or any combination thereof.

As illustrated in the third view 106, at least a portion of the body of the connector device 110 may be in contact with the back surface of the user device 120 and may help stabilize the cable 114 and release the connector 112 from some or all mechanical forces due to pulling of the cable 114 in a downward direction. For example, a force 130 may be applied at the cable 114, such as by a user tugging on the cable 114. The force 130 may have a horizontal component 132 and a vertical component 134. At least a portion of the force 130 may be dissipated into the body of the user device 120 via contact of the connector device 110 with one or more surfaces of the user device 120. For example, a first portion 136 (i.e. some or all) of the horizontal component 132 of the force 130 may be transferred via pressure to a first surface (e.g. the back surface) of the user device 120 and static friction that arises due to the pressure. A second portion 138 (i.e. some or all) of the vertical component 134 of the force 130 may be transferred via pressure to a second surface (e.g. the top surface) of the user device 120.

In alternative embodiments, the user device 120 may be manufactured to include a recess adapted to accommodate the body of the connector device 110 so that mechanical stress from the cable 114 is absorbed by the body of the connector device 110 and by the body of the user device 120, to reduce or eliminate application of force to shells of the connector 112 and the mating connector 124. An example of the user device 120 including recesses adapted to absorb mechanical stress is described in further detail with respect to FIGS. 7-9.

Although the user device 120 is illustrated as a mobile phone, the user device 120 may be any type of device. For example, the user device 120 may include a mobile telephone, a music or video player, a gaming console, an electronic book reader, a personal digital assistant (PDA), a computer, such as a laptop computer, a notebook computer, or a tablet, any other electronic device, or any combination thereof.

In contrast to a conventional USB connector that is not configured to have a U-shape, connection of the connector 112 with the mating connector 124 at an upper edge of a vertically oriented mobile phone results in the cable 114 protruding downward rather than upward from the top of mobile phone. By having the connector device 110 with both the connector 112 and the cable 114 oriented in a downward direction, a significantly reduced impairment to a driver's view may be enabled. In addition, an amount of torque and/or stress to the connector 112, the mating connector 124, and/or a combination thereof may be significantly reduced.

Figure 5:
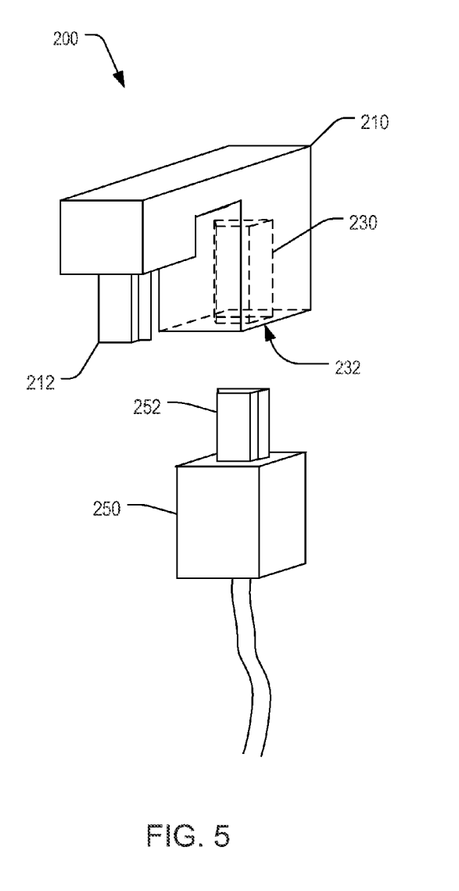
FIG. 5 is a diagram illustrating a system including a second embodiment of a connector device including a first connector and a second connector.

Referring to FIG. 5, a system 200 is illustrated that includes a connector device 210 having a first connector illustrated as a plug 212 in a first leg. The connector device 210 also includes a second connector in a second leg. For example, the second connector may be a USB-type connector, such as a USB-type socket 230, to enable connection of a USB plug 252 of a conventional USB adaptor 250 via an aperture 232. The connector device 210 therefore serves as an adaptor for the conventional USB adaptor 250 that changes a direction of insertion to electrically couple the plug 252 to the user device 120 of FIG. 1 via internal electrical connections within the connector device 210, and as described in further detail with respect to FIG. 6. The connector device 210 may include the socket 230 as an alternative to the cable 114 fixed to the connector 110 device of FIG. 1.

Figure 6:
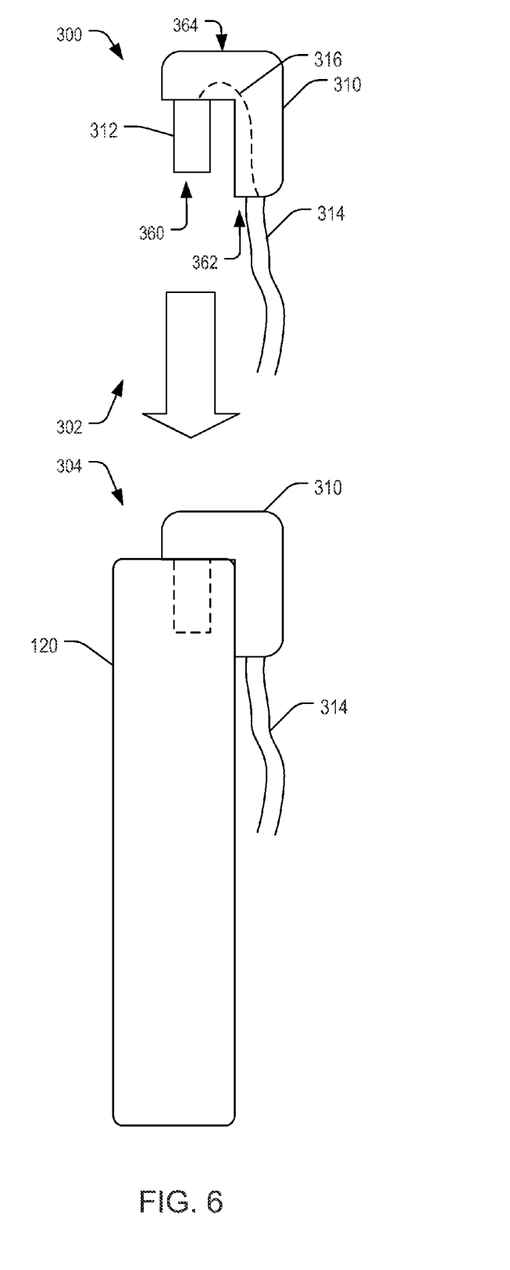
FIG. 6 is a diagram illustrating a system including a third embodiment of a connector device.

Referring to FIG. 6, a system 300 is illustrated in a first view 302 showing a connector device 310 and in a second view 304 showing the connector device 310 coupled to the user device 120.

The first view 302 illustrates the connector device 310 in a side view. A first leg 360 of the connector device 310 includes a connector 312, illustrated as a plug. A second leg 362 that is substantially parallel to the first leg 360 is attached to a cable 314. A transverse portion 364 is connected to the first leg 360 and to the second leg 362. A conductor 316 internal to the connector device 310 is coupled to route an electrical signal from the second leg 362 to the connector 312. For example, the conductor 316 may be included in a cable that is configured to route multiple electrical signals (e.g. a supply voltage and/or supply current, a ground, data and/or control signals, etc.) received via the cable 314 to corresponding contacts of the connector 312. As another example, the conductor 316 may not be included in a cable and may instead provide an electrical path for transfer of power from the cable 314 to a power supply contact and/or ground contact of the connector 312, such as when the connector device 310 is designed for use as a charging adaptor without providing data transfer capability via dedicated data lines of a communication bus. Although the conductor 316 is illustrated and described with respect to the particular embodiment of FIG. 6, one or more conductors similar to the conductor 316 may be implemented in any of the embodiments described herein for routing of electrical signals.

The second view 304 illustrates a side view of the connector device 310 with the connector 312 connected to a mating connector (e.g. a socket) of the user device 120. As illustrated, the connector device 310 is dimensioned to make contact with a body of the user device 120 along an upper surface and a back surface of the user device 120. Contacting the upper surface and the back surface enables a robust transfer of mechanical forces resulting from a downward and/or sideways pull of the cable 314 to be primarily dissipated by the body of the user device 120 rather than via torque or pressure on the connector 312.

In the embodiment illustrated in FIG. 6, the connector device 310 may be designed for a particular configuration of the user device 120 (e.g. a distance between a back of the device and a location of the mating connector, such as the mating connector 124 illustrated in FIG. 1) and may therefore have a sub-optimal configuration for use with a user device having a different size and/or shape. As a result, the connector device 310 may be configured in various sizes to accommodate different types of user devices. Alternatively, a flexible member configured to establish contact with a surface of a user device (e.g. the user device 120) while the connector is coupled to a mating connector of the user device may be used to accommodate various user devices. The flexible member may include a pair of arms, an elastic plug, a curved flexible member, and/or a single arm as illustrated herein.

Figure 7:
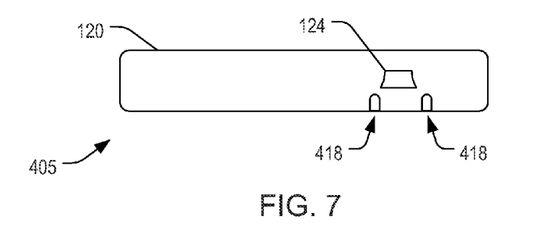
FIG. 7 is a diagram illustrating a first view of a system including a fourth embodiment of a connector device having protrusions to engage recesses in a surface of a user device.
Figure 8:
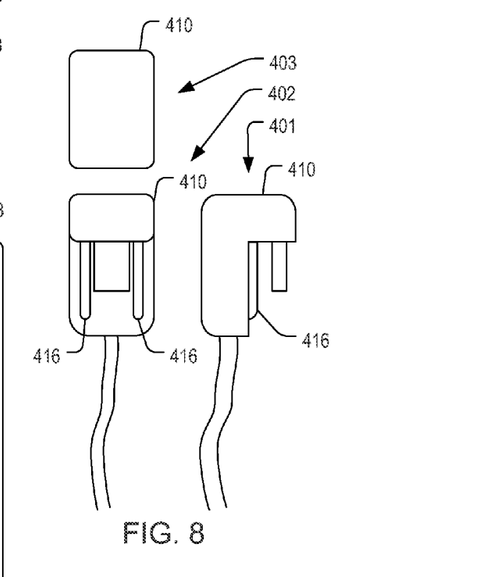
FIG. 8 is a diagram illustrating a second view of a system including a fourth embodiment of a connector device having protrusions to engage recesses in a surface of a user device.
Figure 9:
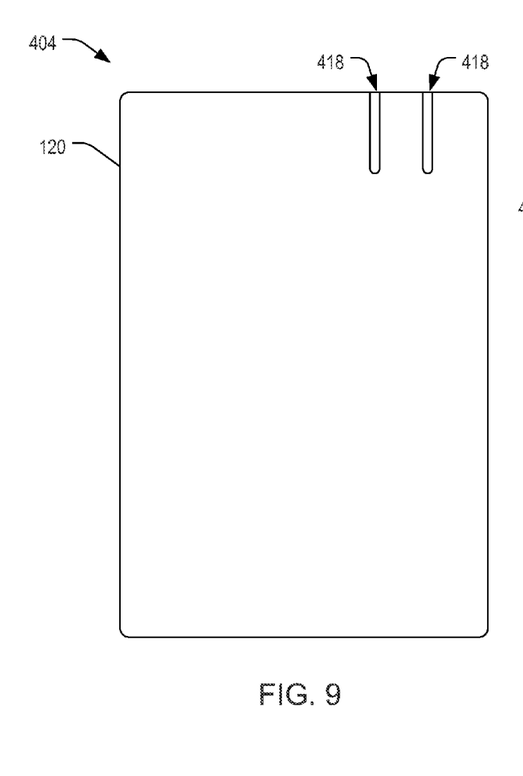
FIG. 9 is a diagram illustrating a third view of a system including a fourth embodiment of a connector device having protrusions to engage recesses in a surface of a user device.
Figure 10:
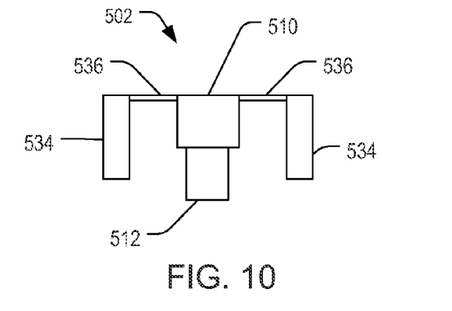
FIG. 10 is a diagram illustrating a first view of a system including a fifth embodiment of a connector device including a connector with a pair of adjustable arms.

Referring to FIGS. 7-9, a system is depicted including a connector device 410 that is illustrated in a side view 401, a front view 402, and a top view 403 and an embodiment of the user device 120 illustrated in a back view 404 and a top view 405.

The connector device 410 includes multiple protrusions 416 configured to be inserted into recesses 418 in the body of the user device 120. When the connector device 410 is connected to the connector 124 (illustrated as a socket), the protrusions 416 are positioned within the recesses 418 in the body of the user device 120. Contact between the protrusions 416 and the surfaces of the recesses 418 provides stress relief by transferring forces received from the connector device 410 into the body of the user device 120 via the surfaces of the recesses 418. Force transfer via mechanical contact between the protrusions 416 and surfaces of the recesses 418 may augment or replace force transfer via friction or "gripping" between the connector device 410 and the back surface of the user device 120.

Although FIGS. 7-9 depict the connector device 410 with two protrusions 416 and the user device 120 with two recesses 418, in other embodiments the connector device 410 may have a single protrusion 416 or more than two protrusions 416. Similarly, the user device 120 may have a single recess 418 or more than two recesses 418. Although the protrusions 416 and the recesses 418 are illustrated as having convex (e.g. semi-circular) cross-sections, in other embodiments the protrusions 416 and the recesses 418 may have different shapes.

Referring to FIGS. 10-14, shown is a connector device 510 that is illustrated in a first view 502 and a second view 504 and that is shown coupled to the user device 120 in a third view 506, a fourth view 507, and a fifth view 508.

The connector device 510 includes a connector 512, such as a plug, extending downward along a first leg of the connector device 510. A first rotatable arm 536 extends from a body of the connector device 510 (e.g. extends from a side of the transverse portion connecting the two legs of the connector device 510) and terminates in a vertical structure 534 that is substantially parallel to the legs of the connector device 510 (i.e. in a downward direction in the first view 502). A second rotatable arm 536 having a vertical structure 534 is attached to a second side of the connector device 510—(e.g. extends from another side of the transverse portion). The rotatable arms 536 enable a movement of the structures 534 based on a size of user device that is attached to the connector device 510, as illustrated in the views 506-508.

Figure 11:
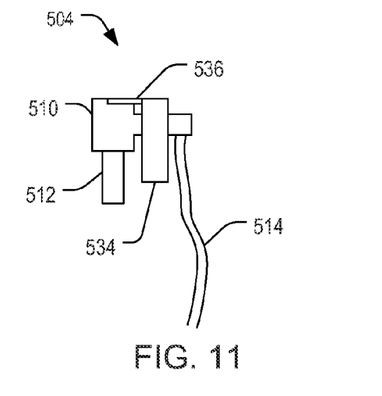
FIG. 11 is a diagram illustrating a second view of a system including a fifth embodiment of a connector device including a connector with a pair of adjustable arms.

The second view 504 is a side view of the connector device 510. In the second view 504, the two legs of the device 510 are visible, with the connector 512 extending downward at a first leg of the connector device 510 and with a cable 514 extending downward at a second leg of the connector device 510.

Figure 12:
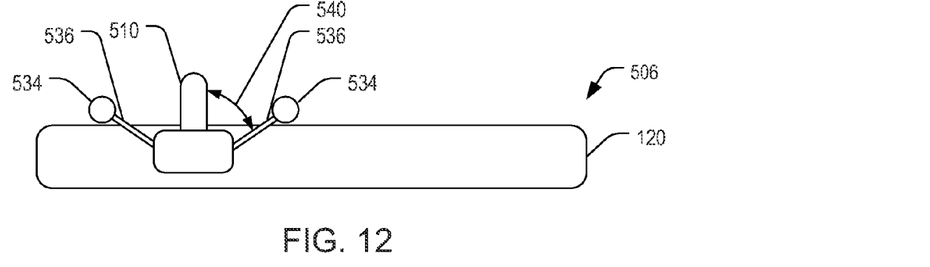
FIG. 12 is a diagram illustrating a third view of a system including a fifth embodiment of a connector device including a connector with a pair of adjustable arms.

The third view 506 shows a top view of the connector device 510 coupled to the user device 120 (e.g. the connector 512 is coupled to a mating connector of the user device 120). The user device 120 has a first width (e.g. a distance from a front surface to a back surface). The rotatable arms 536 are positioned to press the vertical structures 534 against the back surface of the user device 120 and form a first angle 540 relative to the transverse portion of the connector device 510. The rotatable arms 536 may be biased to return to a neutral position where the angle relative to the transverse portion of the connector device 510 is slightly less than or equal to 90 degrees. By rotating the arms 536 to the angle 540 to accommodate the width of the user device 120, a spring-type force may be exerted by the vertical structures 534 of the arms 536 against the back surface of the user device 120. In this manner, the vertical structures 534 may assist in dissipating forces that may be exerted via the cable 514 into the body of the user device 120 rather than transferring the forces to the connector 512 and the mating connector of the user device 120.

Figure 13:
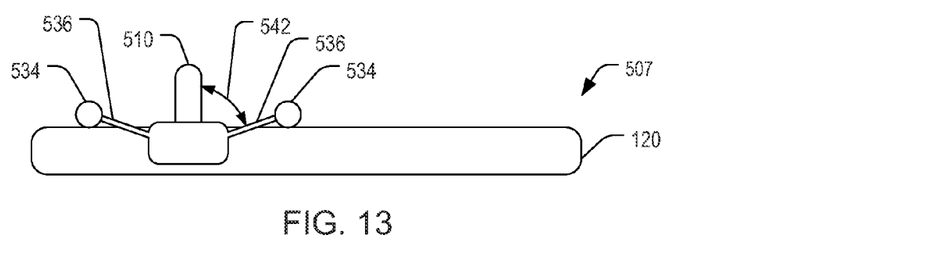
FIG. 13 is a diagram illustrating a fourth view of a system including a fifth embodiment of a connector device including a connector with a pair of arms.

The fourth view 507 illustrates a top view of the connector device 510 attached to the user device 120, the user device 120 having a thinner width than in the third view 506. Because the user device 120 has a thinner width than the user device 120 in the third view 506, the arms 536 are rotated at a larger angle 542 (i.e. closer to a parallel orientation) to press the vertical structures 534 against the back surface of the user device 120.

Figure 14:
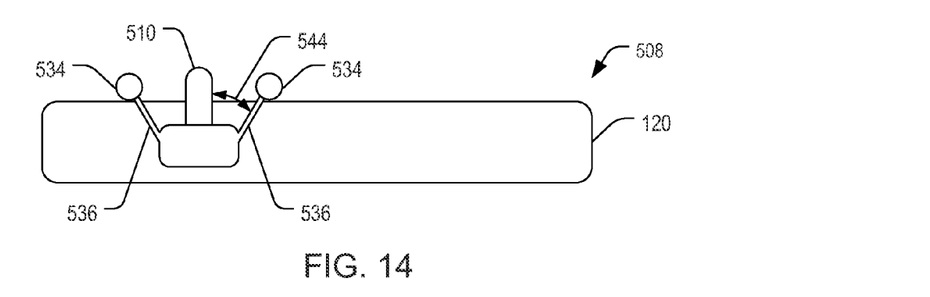
FIG. 14 is a diagram illustrating a fifth view of a system including a fifth embodiment of a connector device including a connector with a pair of arms.

In the fifth view 508, the connector device 510 is illustrated connected to the user device 120, the user device 120 having a thicker width than in the third view 506 and in the fourth view 507. As a result of the thicker width of the user device 120, the rotatable arms 536 are rotated to form a smaller angle 544 while the vertical structures 534 exert pressure along the back surface of the user device 120.

By use of the rotatable arms 536, the connector device 510 may accommodate a variety of user devices 120 having differing widths. As described, the arms 536 may be rotatably attached to the device 510 and biased to a parallel or near-parallel orientation (i.e., in a neutral position, the angle 540 is approximately or slightly less than 90 degrees). As an example, the body of the connector device 510 including the arms 536 with the vertical structures 534 may be injection molded of a flexible material enabling a flexion of the arms 536 to accommodate user devices 120 of different sizes. As another example, the rotatable arms 536 may be pivotably attached to a body of the connector device 510 and biased using a spring or other resilient material.

Figure 15:
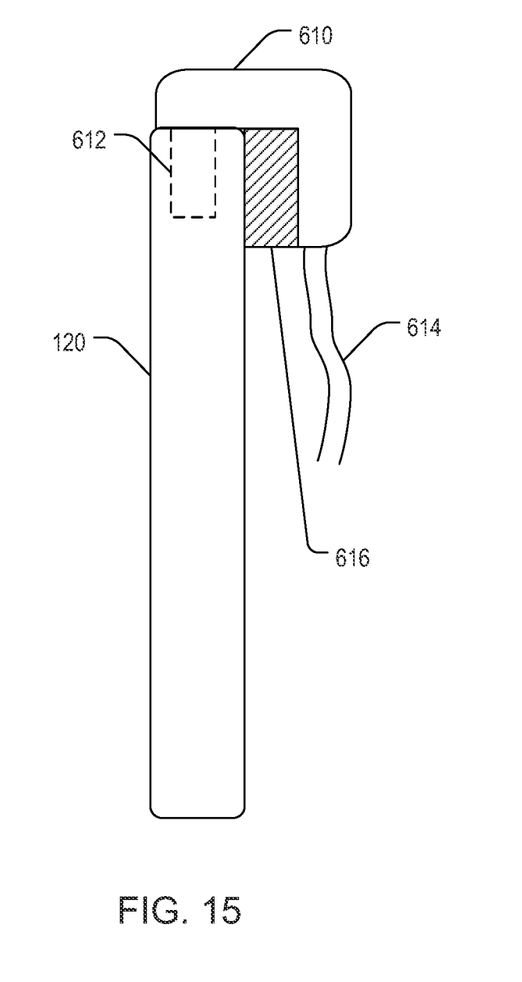
FIG. 15 is a diagram illustrating a system including a sixth embodiment of a connector device including a connector and a flexible pad.

Referring to FIG. 15, a connector device 610 is illustrated coupled to the user device 120 and is shown in a side view. The connector device 610 has a connector 612 (such as a plug shown in dashed lines as inserted into a socket internal to the user device 120) along a first leg of the connector device 610. A cable 614 extends from the second leg of the connector device 612. A flexible member such as an elastic plug 616 is positioned along a side of the second leg of the connector device 610 and is configured to press against the back surface of the user device 120. The elastic plug 616 may be compressible to enable the elastic plug 616 to have a varying thickness to accommodate different widths of the user device 120. For example, a thicker user device 120 may cause a greater amount of compression of the elastic plug 616, while a thinner user device 120 may cause a lesser amount of compression of the elastic plug 616. The connector device 610 including the elastic plug 616 may function to accommodate user devices of various widths and/or distances between a mating connector (e.g. a socket) and a back of the user device.

Figure 16:
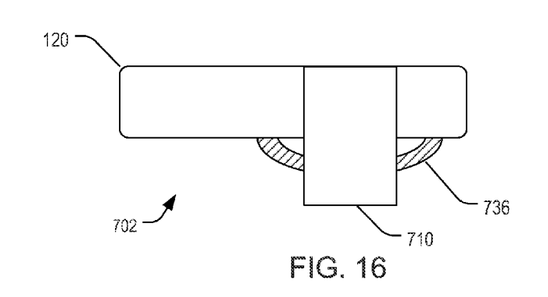
FIG. 16 is a diagram illustrating a first view of a system including a seventh embodiment of a connector device including a connector and a curved flexible member.
Figure 17:
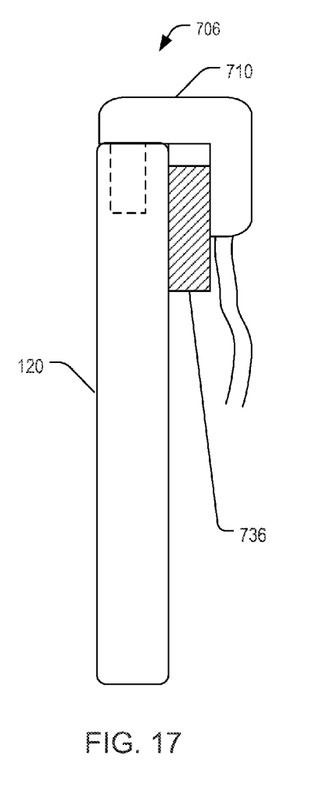
FIG. 17 is a diagram illustrating a second view of a system including a seventh embodiment of a connector device including a connector and a curved flexible member.
Figure 18:
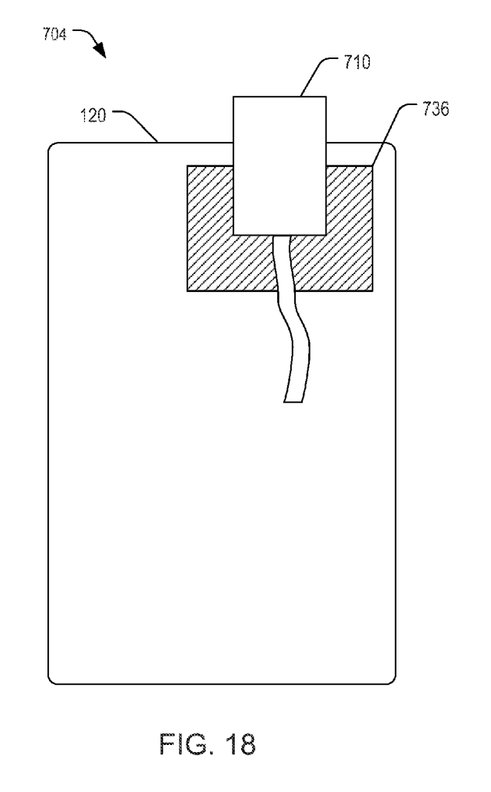
FIG. 18 is a diagram illustrating a third view of a system including a seventh embodiment of a connector device including a connector and a curved flexible member.
Figure 19:
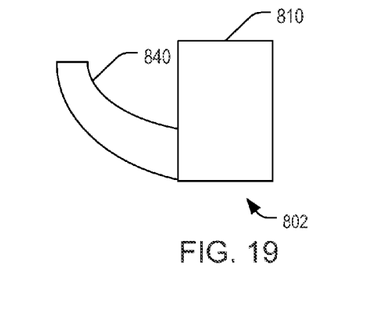
FIG. 19 is a diagram illustrating a first view of a system including an eighth embodiment of a connector device including a connector and a curved flexible member.
Figure 20:
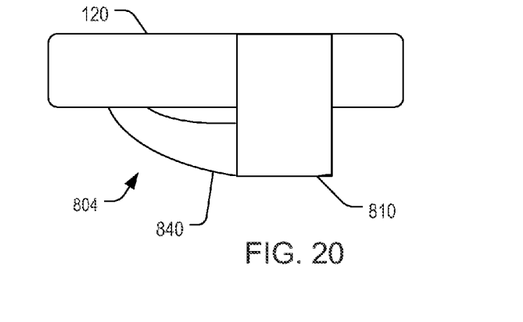
FIG. 20 is a diagram illustrating a second view of a system including an eighth embodiment of a connector device including a connector and a curved flexible member.
Figure 21:
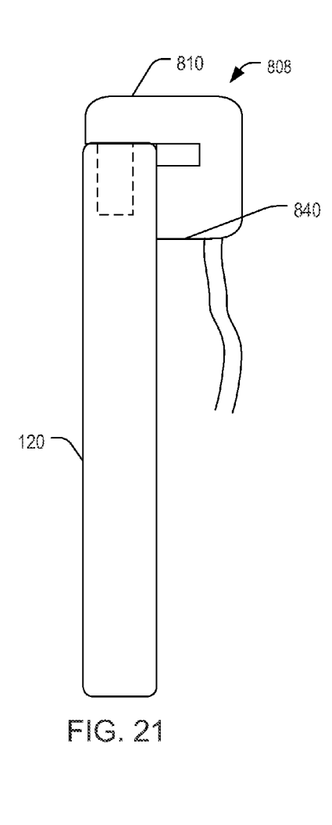
FIG. 21 is a diagram illustrating a third view of a system including an eighth embodiment of a connector device including a connector and a curved flexible member.
Figure 22:
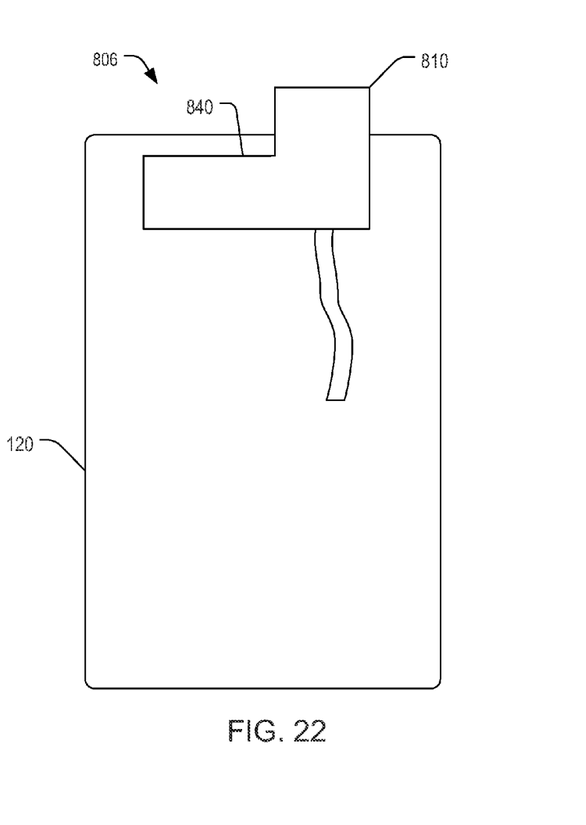
FIG. 22 is a diagram illustrating a fourth view of a system including an eighth embodiment of a connector device including a connector and a curved flexible member.

FIGS. 16-18 illustrate a system shown in a top view 702, a back view 704, and a side view 706. The system includes a connector device 710 having a flexible curved member 736. As illustrated in the top view 702, the flexible curved member 736 extends from the second leg of the connector device 710 (i.e. from an attachment point near the cable) to a back surface of the user device 120. The flexible curved member 736 may flex to accommodate a width of the user device 120 and to contact multiple portions of the back surface of the user device 120 to exert a pressure against the back surface of the user device 120. The back view 704 illustrates the second leg of the connector device 710 and the flexible curved member 736.

Referring to FIGS. 19-22, illustrated is a first view 802 showing a top view of a connector device 810 having a single flexible curved member 840 extending from one side of a second leg of the connector device 810 to make contact with the back surface of a user device 120. A top view 804, a back view 806, and a side view 808 each include the device connector 810 coupled to the user device 120 illustrate a deformation of the flexible curved member 840 to accommodate a width of the user device 120.

Figure 23:
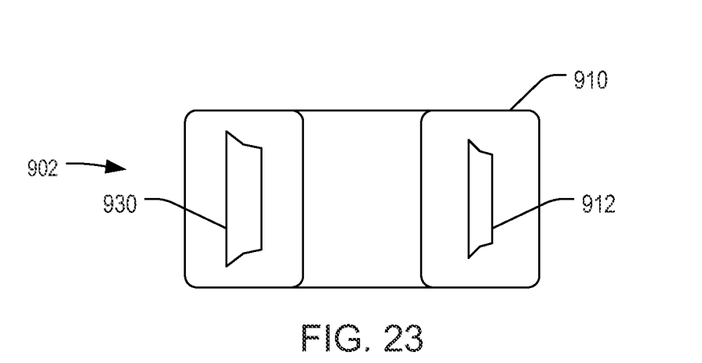
FIG. 23 is a diagram illustrating a first embodiment of a connector device including male and female connectors.
Figure 24:
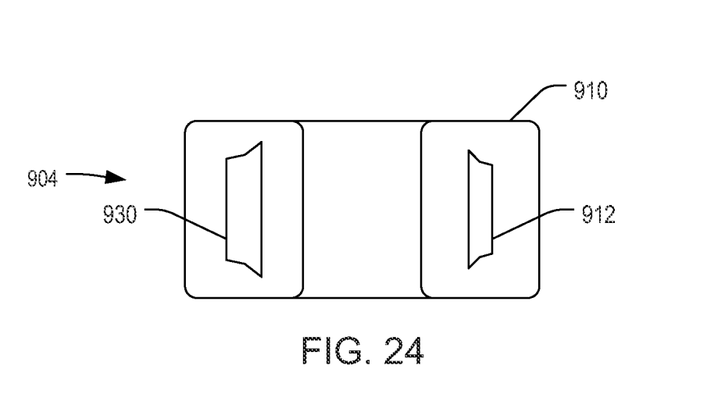
FIG. 24 is a diagram illustrating a second embodiment of a connector device including male and female connectors.
Figure 25:
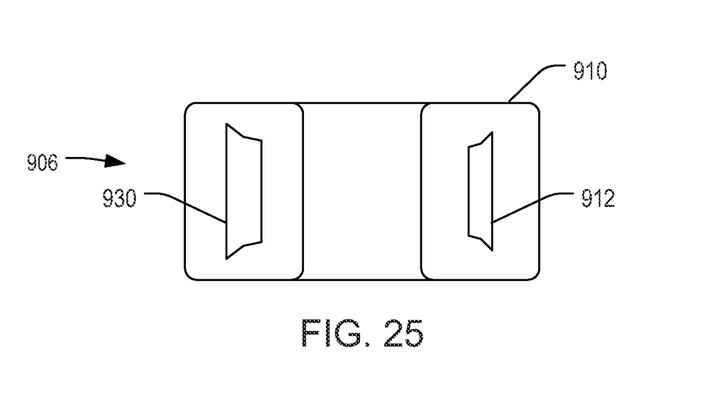
FIG. 25 is a diagram illustrating a third embodiment of a connector device including male and female connectors.

Referring to FIGS. 23-25, various embodiments of a connector device 910 are illustrated from a bottom view (i.e. looking from an end of each leg of the connector device toward a transverse central portion of the connector device). In a first embodiment 902, the connector device 910 is illustrated as having a female socket 930 and a male plug 912 having a same orientation. In a second embodiment 904, the connector device 910 is illustrated as having the female socket 930 and the male plug 912 in opposite orientations according to a first configuration. In the third embodiment 906, the connector device 910 is illustrated as having the female socket 930 and the male plug 912 in opposite orientations according to a second configuration. The various configurations and orientations of the socket 930 and the plug 912 may enable selection of an appropriate connector device 910 to accommodate various types of devices.

Figure 26:
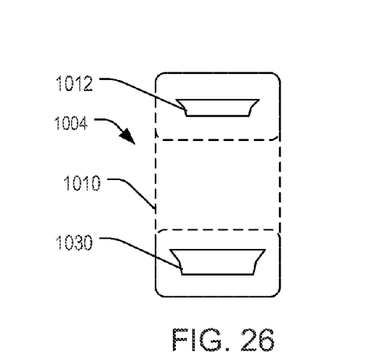
FIG. 26 is a diagram illustrating a first view of another embodiment of a connector device including male and female connectors.
Figure 27:
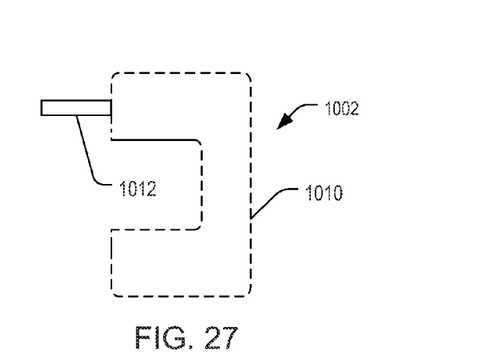
FIG. 27 is a diagram illustrating a second view of another embodiment of a connector device including male and female connectors.
Figure 28:
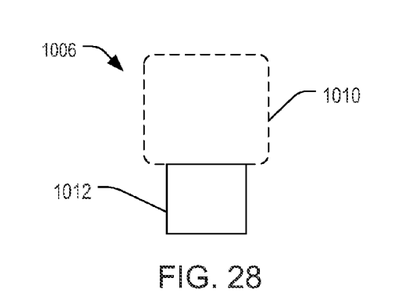
FIG. 28 is a diagram illustrating a third view of another embodiment of a connector device including male and female connectors.

FIGS. 26-28 illustrate a system depicting a device 1010 in a front view 1004, a side view 1002, and a top view 1006. The device 1010 has a male plug 1002 extending outward from the first leg of the device 1010 and a female socket 1030 recessed within a second leg of the device 1010.

Figure 29:
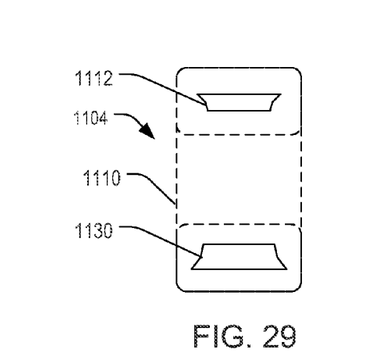
FIG. 29 is a diagram illustrating a first view of yet another embodiment of a connector device including male and female connectors.
Figure 30:
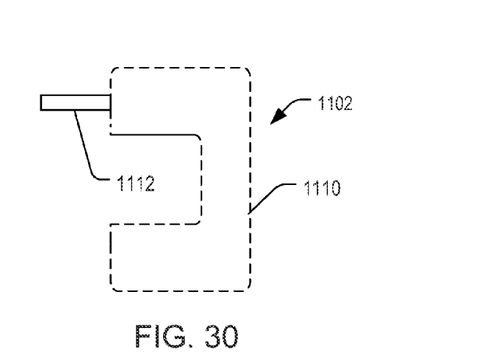
FIG. 30 is a diagram illustrating a second view of yet another embodiment of a connector device including male and female connectors.
Figure 31:
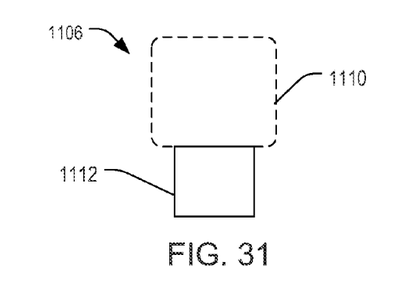
FIG. 31 is a diagram illustrating a third view of yet another embodiment of a connector device including male and female connectors.

FIGS. 29-31 illustrate a system including a device 1110 in a front view 1104, a side view 1102, and a top view 1106. The device 1110 includes a male plug 1102 extending outward from a first leg of the device 1110 and a female socket 1130 recessed within a second leg of the device 1110. A relative orientation of the plug 1102 and the socket 1130 is different than the relative orientations of the plug 1002 and the socket 1030 illustrated in FIGS. 26-28.

Although the embodiments illustrated in FIGS. 1-4 and 6-22 include a cord attached to and/or integrated with the second leg of a connector device while the embodiments illustrated in FIGS. 5 and 23-31 include a second connector integrated in the second leg, any of the illustrated physical configurations of the connector devices illustrated in FIGS. 1-31 may optionally include either a cord or a second connector integrated in the second leg of the connector device.

Figure 32:
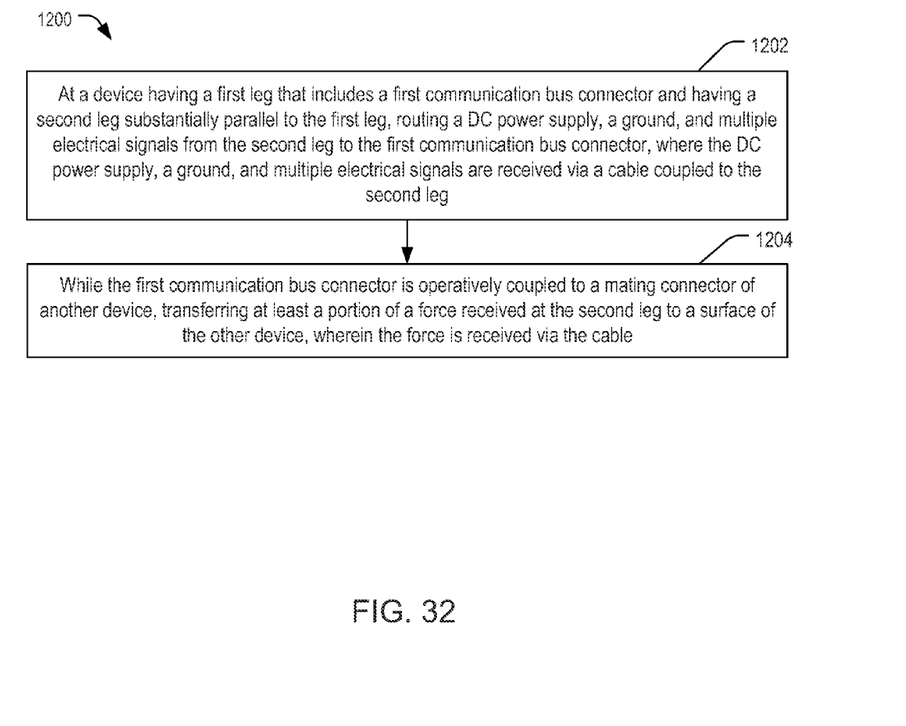
FIG. 32 is a flow chart of a particular illustrative embodiment of a method that can be performed by a connector device.

FIG. 32 illustrates a particular embodiment of a method 1200 that may be performed at a device having a first leg that includes a first connector and having a second leg that is substantially parallel to the first leg. The first connector may include multiple electrical contacts including a DC supply contact, a ground contact, and at least two electrical signal contacts. For example, the method 1200 may be performed by the connector device of any of FIGS. 1-31.

The method 1200 includes, while the first connector is operatively coupled to a mating connector of another device, routing a power supply, a ground, and multiple electrical signals from the second leg to respective contacts of the first connector, at 1202. For example, the plug 112 of FIG. 1 may be in electrical contact with the socket 124 of the user device

120. The power supply, the ground, and the multiple electrical signals may be received via a cable coupled to the second leg.

The first connector may be a USB-type plug, such as a micro-USB plug. In other implementations, the first connector may be another type of connector, such as an Institute of Electrical and Electronics Engineers (IEEE) 1394 High Speed Serial Bus-type connector, a High Definition Multimedia Interface (HDMI)-type connector, or any other type of connector. In some implementations the device includes the cable (e.g. the cable is fixedly attached to the second leg). Alternatively, the second leg may include a second connector and the cable may be connected to the device via the second connector.

At least a portion of a force received at the second leg is transferred to a surface of the other device, at 1204. The force may be received via the cable, such as illustrated in FIG. 4. Transferring the force to the surface of the other device while routing the power supply, the ground, and the multiple electrical signals to the first connector may reduce a stress related to the force applied to the mating connector. In some implementations, the device is shaped to contact a top surface and a back surface of the other device, such as illustrated in FIGS. 1-9. In other implementations, the device includes a flexible member configured to establish contact with the surface of the other device while the first connector is coupled to the mating connector of the other device, such as illustrated in FIGS. 10-22.

A first portion of the force may be transferred via pressure to a first surface of the other device and a second portion of the force may be transferred via pressure to a second surface of the other device. To illustrate, a downward component of the force applied via the cable 114 illustrated in FIG. 4 may be transferred via downward pressure to a top surface of the user device 120 of FIG. 4. A horizontal component of the force may be transferred via pressure to a back surface of the user device 120.

Although the term "U-shaped" may be used in descriptions of various embodiments, such terminology is provided for simplicity of explanation and not for structural limitation. For example, a device including a first leg (e.g. the first leg 160 of FIG. 1) including a connector, a second leg (e.g. the second leg 162 of FIG. 1) that is substantially parallel to the first leg, and a transverse portion (e.g. the transverse portion 164 of FIG. 1) need not have a "U" shape and may instead have one or more other shapes. To illustrate, in the configuration illustrated in FIG. 1, one or both of the first leg 160 and the second leg 162 may protrude above the transverse portion 164 in addition to protruding below the transverse portion 164 (e.g., forming an "H" shape). As another example, one or both of the first leg 160 and the second leg 164 may not protrude below the transverse portion 164. To illustrate an embodiment where the leg 160 may not protrude below transverse portion 164, the connector 112 may include a socket recessed upward into the first leg 160 rather than a plug protruding downward from the first leg 160.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A connector device comprising:
    a first leg including a connector comprising a universal serial bus (USB)-type device that includes a direct-current (DC) supply contact, a ground contact, and at least two electrical signal contacts;
    a second leg substantially parallel to the first leg, wherein the second leg has a body portion and a cable portion, wherein the cable portion is fixedly attached to the body portion and is external to the body portion, and wherein the body portion and the cable portion include a set of conductors configured to route electrical signals comprising a DC supply, a ground, and at least two signals;
    a transverse portion connected to the first leg and to the body portion of the second leg, wherein the transverse portion, the first leg, and the body portion of the second leg form a substantially rigid or semi-rigid structure, and wherein the transverse portion includes multiple paths electrically coupling the set of conductors of the cable portion to the connector, the multiple paths configured to route electrical signals between the connector and the set of conductors of the cable portion; and
    a flexible member connected to the second leg, wherein the flexible member is configured to contact a surface of an electronic device while the connector is coupled to a mating connector of the electronic device.

2. The connector device of claim 1, wherein the connector is a male connector.

3. The connector device of claim 1, wherein the connector is a female connector.

4. The connector device of claim 1, wherein the set of conductors of the cable portion includes conductors for at least one of a high speed serial interface type connection or a high definition multimedia interface-type connection.

5. The connector device of claim 1, wherein the flexible member is configured to establish contact with a back surface of the electronic device while the connector is coupled to the mating connector of the electronic device.

6. The connector device of claim 1, wherein the flexible member includes an elastic plug.

7. The connector device of claim 1, wherein the flexible member comprises a curved member adapted to contact multiple portions of the surface of the electronic device while the connector is coupled to the mating connector of the electronic device.

8. The connector device of claim 1, further comprising a protrusion configured to contact a recess in the surface of the electronic device while the connector is coupled to the mating connector of the electronic device.

9. The connector device of claim 1, wherein the flexible member includes an arm adapted to press against the surface of the electronic device while the connector is coupled to the mating connector of the electronic device.

10. The connector device of claim 9, further comprising a second arm adapted to press against the surface of the electronic device while the connector is coupled to the mating connector of the electronic device.

11. A method comprising:
    at a device having a first leg that includes a connector comprising a universal serial bus (USB)-type device that includes a direct-current (DC) supply contact, a ground contact, and at least two electrical signal contacts, and having a second leg substantially parallel to the first leg, wherein the second leg has a body portion and a cable portion, wherein the cable portion is fixedly attached to the body portion and is external to the body portion, and wherein the body portion and the cable portion include a set of conductors configured to route electrical signals comprising a DC supply, a ground, and at least two signals, the device including a transverse portion connected to the first leg and to the body portion of the second leg, wherein the transverse portion, the first leg, and the body portion of the second leg form a substantially rigid or semi-rigid body, and a flexible member connected to the second leg, wherein the flexible member is configured to contact a surface of an electronic device while the connector is coupled to a mating connector of the electronic device, performing, while the connector is operatively coupled to the mating connector of the electronic device:

routing the DC supply, the ground, and the at least two signals from the cable portion of the second leg to respective contacts of the connector; and transferring via the flexible member at least a portion of a force received at the second leg to the surface of the electronic device, wherein the force is received via the cable portion.

12. The method of claim 11, wherein transferring the at least a portion of the force to the surface of the electronic device while routing the DC supply, the ground, and the at least two signals to the connector reduces a stress related to the force applied to the mating connector.

13. The method of claim 11, wherein a first portion of the force is transferred via pressure to a first surface of the electronic device, and wherein a second portion of the force is transferred via pressure to a second surface of the electronic device.

14. The method of claim 11, wherein the connector comprises a USB-type plug.

15. The method of claim 11, wherein the set of conductors of the cable portion includes conductors for at least one of a high speed serial interface type connection or a high definition multimedia interface-type connection.

16. The method of claim 15, wherein the connector is a male connector.

17. The method of claim 11, wherein the flexible member comprises an arm configured to establish contact with the surface of the electronic device while the connector is coupled to the mating connector of the electronic device.

18. The method of claim 17, wherein the flexible member comprises two arms.

\* \* \* \* \*